Figure 1:
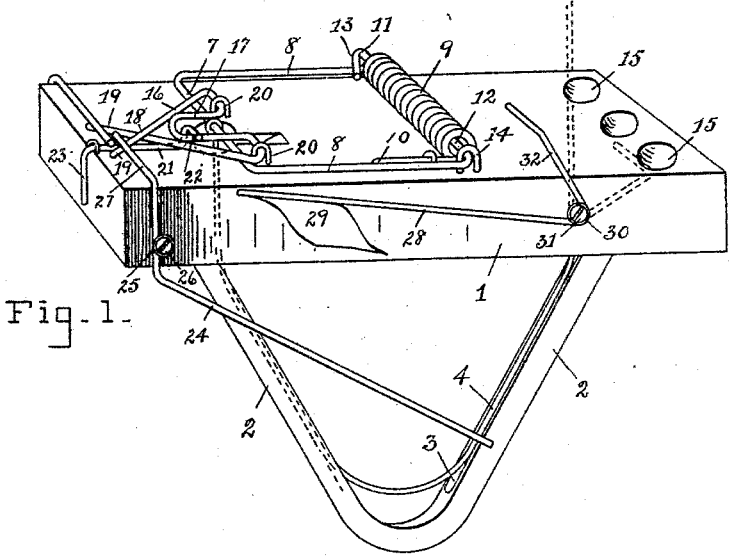

(No Model.)

W. M. BALL.
MOLE TRAP.

No. 602,818. Patented Apr. 26, 1898.

Witnesses
Lee J. Van Horn.
Victor J. Evans.

Inventor
Wm. M. Ball.
By John Wedderburn.
Attorney

UNITED STATES PATENT OFFICE.

WILLIAM M. BALL, OF AUBURN, NEBRASKA.

MOLE-TRAP.

SPECIFICATION forming part of Letters Patent No. 602,818, dated April 26, 1898.

Application filed April 24, 1897. Serial No. 633,639. (No model.)

*To all whom it may concern:*

Be it known that I, WILLIAM M. BALL, a citizen of the United States, residing at Auburn, in the county of Nemaha and State of Nebraska, have invented certain new and useful Improvements in Mole-Traps; and I do hereby declare the following to be a full, clear, and exact description of the invention, such as will enable others skilled in the art to which it appertains to make and use the same.

This invention relates to mole-traps, and has for its object to provide a simple and efficient device of the character referred to which is adapted to be inserted in the ground at any desired point and set with ease and rapidity.

The detailed objects and advantages of the invention will be pointed out in the course of the subjoined description.

The invention consists in an improved mole-trap embodying certain novel features and details of construction and arrangement of parts hereinafter fully described, illustrated in the drawings, and incorporated in the claims hereto appended.

Figure 2:
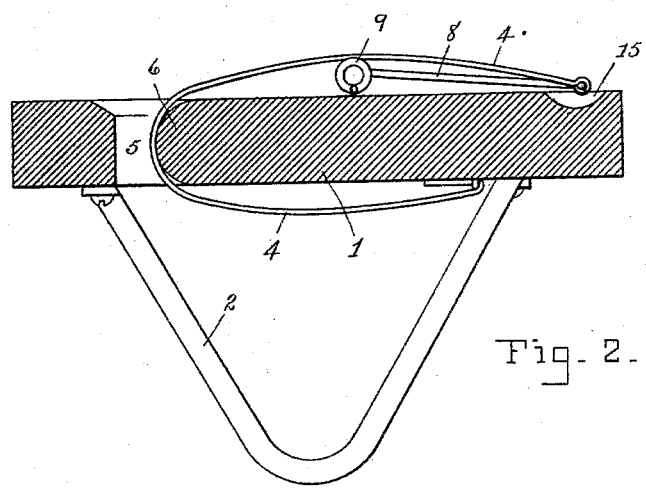

In the accompanying drawings, Figure 1 is a perspective view of a mole-trap constructed in accordance with the present invention and showing the trap set. Fig. 2 is a longitudinal section through the trap, showing the same sprung.

Similar numerals of reference designate corresponding parts in both views.

The mole-trap comprises, essentially, a base or block 1, which is rectangular, or substantially so, and which is provided upon its under side with a V-shaped or semi-elliptical snare-shield 2, having its lower or outer edge sharpened throughout its entire length to adapt the same to easily puncture the soil adjacent to the track of a mole, it being intended that the trap shall be placed in position so that the sharpened snare-shield will enter the ground in a plane transversely of the mole-track, so that the track of the mole will lie within the open center of the shield or between the shield and the bottom of the block 1. The snare-shield is secured at its ends to the bottom of the block 1 in any convenient manner and is provided along its inner edge with a groove 3, in which the snare 4 is adapted to lie when the trap is set, said snare consisting, preferably, of a piece of wire, although any desired material of the necessary strength may be employed in lieu of the snare-wire.

The block is provided with a vertical opening 5, having one edge rounded, as indicated at 6, to avoid sharp corners or angles, which would tend to crimp the snare-wire. The wire 4 passes upward through said aperture and extends above the block 1, where it is attached loosely to the cross-bar or central portion 7 of a spring 8. One terminal of the spring is coiled, as indicated at 9, so as to extend transversely across the block 1, and the end of the spring is extended longitudinally of the block and bent at 10 and inserted in the block, whereby it is held. The other terminal 11 of the spring is bent to form a transverse portion 12, which extends through the coiled portion 9, the extremity of said terminal being bent abruptly and preferably at an acute angle, as indicated at 13, so as to bear against the block 1, the spring being held in place on the block by staples or other suitable fasteners 14, driven over the bent portion 12 of the spring. The block 1 is also provided with finger-rests 15 to facilitate the grasping of the spring 8 for setting the trap.

16 designates a trigger which is constructed, preferably, from a piece of wire bent substantially in the form of a heart, the central portion being curved to form a loop 17, while the terminal portions are crossed, as indicated at 18, and extended to form diverging ends 19, with which the trips engage. The trigger is pivotally connected to the upper surface of the block 1 by means of staples or other suitable fasteners 20, and when the spring 8 is thrown to that side of the block where the trigger is located the trigger may be vibrated, so as to extend toward the end of the block and to pass over the central portion or connecting-bar 7 of the spring, so as to hold the spring under tension. In order to prevent the accidental shifting of the trigger while the remainder of the trap is being set, a safety-catch 21 is provided, the same having at one end a catch-lip 22, adapted to engage over the loop portion 17 of the trigger and having at its opposite end a crank-arm 23, by which it may be rocked into and out of engagement with the trigger.

Pivotally mounted at each side of the block 1 is a trip 24. Each trip is preferably formed from a piece of wire and provided intermediate its ends with a coil or eye 25, adapted to receive a screw or pin 26, forming the fulcrum of the trip. The long arm of the trip extends longitudinally of the block 1 and is flattened in parallel relation to the block and extends when in proper position across the mole-track. The short arm of the trip is extended upward on one side of the block, and its end is then turned inward at substantially a right angle, as indicated at 27, where it is adapted to engage over one of the diverging end portions 19 of the trigger 16. Two of these trips are employed, one on each side of the block, and both are adapted to engage with the trigger, or only one at a time may be caused to engage therewith, as preferred.

Pivotally mounted on one side of the block 1 is a flagstaff 28, which when the trap is set lies in a horizontal position, the same having secured to its free end a small flag 29. This staff is preferably formed from a piece of wire of the necessary stiffness and is provided at the point 30 with an eye adapted to receive a screw or other fastener 31, forming the pivot of the staff. The staff is also provided with an angular short arm 32, extending upward on the side of the block 1 and having its extremity bent inward over the block, so as to lie in the path of the spring. Thus it will be seen that as the spring is released it will operate against the angular arm of the flagstaff and thereby throw the flagstaff into an upright or vertical position, thus notifying a bystander of the fact that the trap has been sprung.

The operation of the device will be readily understood from the foregoing description. Supposing the trap to be set, with the mole-path lying in and through the snare-shield, when the mole approaches it will come in contact with the long arm of one of the trips, thereby moving the short arm of said trip out of engagement with the trigger. If this is the only trip in engagement with the trigger, the trap will at once be sprung. If both trips are in engagement with the trigger, upon the further progress of the mole it will come in contact with the remaining trip, and thus the trap will be sprung. When the trap is sprung, the snare-wire is drawn upward, so as to lie close against the bottom of the block 1, and the power of the spring is exerted upon said wire, thereby causing it to catch and hold the mole between it and the bottom of the block. At the same time the spring will come in contact with the angular arm of the flagstaff, thereby throwing the staff to a vertical position in the manner above described and for the purpose set forth.

It will of course be understood that the device and the several parts thereof are susceptible of various changes in the form, proportion, and minor details of construction, which may accordingly be resorted to without departing from the principle or sacrificing any of the advantages of the invention.

Having thus described the invention, what is claimed as new, and desired to be secured by Letters Patent, is—

1. In a mole-trap, the combination with a suitable block or base, of a snare-shield secured thereto at one end, a snare adapted to lie close to or within the shield, and means for actuating the opposite end of said snare, substantially as described.

2. In a mole-trap, the combination with a suitable block or base, of a snare-shield grooved to receive the snare, substantially as described.

3. In a mole-trap, the combination with a suitable block or base, of a snare-shield secured to the lower side thereof and having one of its edges grooved to receive the snare and its opposite edge sharpened, substantially as described.

4. In a mole-trap, the combination with a suitable block or base, of a snare-shield, a snare-wire, a spring for actuating said wire, and a trigger for holding and releasing said spring, substantially as described.

5. In a mole-trap, the combination with a suitable block or base, of a snare-wire, a spring for actuating said wire, a snare-shield, a trigger for said spring, and a trip for engaging and releasing the trigger, substantially as described.

6. In a mole-trap, the combination with a suitable base or block, of a snare-wire fastened at one end and partially underlying the block and passing therethrough, a spring arranged above the block for drawing upon the other end of said wire, a trigger for holding said spring, a trip for engaging and releasing said trigger, and a safety-catch for holding the trigger, substantially as described.

7. In a mole-trap, the combination with a suitable block or base, of a snare-wire fastened at one end and passing therethrough and partially underlying the block, a spring on the upper side of the block for pulling the free end of said wire, a pivoted trigger for engaging said spring, and a trip pivotally mounted at one side of the block and having a short arm to engage said trigger, and a long arm to project across the mole-path, substantially as described.

8. In a mole-trap, the combination with a suitable block or base, of a snare-wire, actuating means therefor, and a movable flagstaff arranged to be actuated by the means which actuates the snare-wire, substantially as described.

9. In a mole-trap, the combination with a suitable block or base, of a snare-wire, an actuating-spring for said wire, and a flagstaff pivotally mounted on said block or base and having a portion thereof arranged in the path of the spring, substantially as described.

In testimony whereof I have signed this specification in the presence of two subscribing witnesses.

WILLIAM M. BALL.

Witnesses:
J. A. WINTERS,
C. L. BALL.